(12) United States Patent
Knevels

(10) Patent No.: US 7,776,254 B2
(45) Date of Patent: Aug. 17, 2010

(54) LANCE FOR RECEIVING SENSOR OR SAMPLER FOR METAL MELTS

(75) Inventor: Johan Knevels, Bree (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 0 days.

(21) Appl. No.: 12/401,890

(22) Filed: Mar. 11, 2009

(65) Prior Publication Data
US 2009/0230597 A1 Sep. 17, 2009

(30) Foreign Application Priority Data
Mar. 11, 2008 (DE) .................. 10 2008 013 698

(51) Int. Cl.
*G01N 1/12* (2006.01)
(52) U.S. Cl. ............................................. 266/225
(58) Field of Classification Search ............ 266/225
See application file for complete search history.

(56) References Cited

U.S. PATENT DOCUMENTS 3,369,406 A * 2/1968 Lowdermilk et al. ...... 73/864.52

FOREIGN PATENT DOCUMENTS

| DE | 33 22 556 A1 | 1/1985 |
|---|---|---|
| DE | 36 41 225 A1 | 6/1987 |
| DE | 37 29 437 A1 | 11/1988 |
| DE | 197 07 373 C1 | 2/1998 |
| DE | 298 05 881 U1 | 8/1998 |
| EP | 0 372 099 A1 | 6/1990 |
| EP | 1 883 078 A1 | 1/2008 |
| FR | 2 668 215 A1 | 4/1992 |

* cited by examiner

*Primary Examiner*—Scott Kastler
(74) *Attorney, Agent, or Firm*—Panitch Schwarze Belisario & Nadel LLP

(57) ABSTRACT

A lance has a top part and a bottom part for arrangement on the sensor or sampler. The top and bottom parts are detachably connected to each other by a plug-in coupling. The plug-in coupling has two coupling parts, one arranged on the top part and the other arranged on the bottom part of the lance, that can be inserted one in the other in the longitudinal direction of the lance. One coupling part has an opening extending from its front face in the longitudinal direction of the lance and an extension formed in the peripheral direction of the coupling part. The other coupling part has a raised portion that engages the extension. A blocking device, movable in the longitudinal direction of the lance, is arranged on the top or bottom part A catch element of the blocking device is arranged at least partially between the raised portion and the opening.

6 Claims, 4 Drawing Sheets

LANCE FOR RECEIVING SENSOR OR SAMPLER FOR METAL MELTS

BACKGROUND OF THE INVENTION

The invention relates to a lance for receiving a sensor or sampler for metal melts, the lance having a top part and a bottom part provided for arrangement on the sensor or sampler.

Such lances are known, for example, from German published patent application DE 36 41 225 A1. They are used, among other things, in steelworks for handling samplers or sensors. They have essentially metallic tubular constructions and coupling parts. On one end the lance can have a handle for the operator, and the carrier tube of the sensor or sampler is placed on the other end. This carrier tube is usually formed from cardboard. The lance contains a mechanical and an electrical coupling, in order to connect the electrical lines of the sampler or sensor to forwarding lines. These lines conduct measurement values or other signals from the sampler or sensor to evaluation units. Frequently, the lance is formed from different parts, in order to allow, for example, an exchange of the connection part for the carrier tube of the sensor or sampler. Such an exchange must be possible very securely and quickly with respect to handling in the steelworks.

Another lance is known from German Utility Model DE 298 05 881 U1. This lance is made from components that can be joined together and that can be easily detached from each other.

BRIEF SUMMARY OF THE INVENTION

An object of the present invention is to improve the known lances and to enable a reliable and quick connection of two lance parts or a quick exchange of these parts.

The object is achieved according to the invention for a lance for receiving a sensor or sampler for metal melts in which the lance has a top part and a bottom part provided for arrangement on the sensor or sampler. It is essential that the top part and the bottom part of the lance are connected to each other detachably by a plug-in coupling, wherein the plug-in coupling has two coupling parts that can be inserted one in the other. Of these coupling parts, one coupling part is arranged on the top part and the other coupling part is arranged on the bottom part of the lance, wherein the two coupling parts are inserted one in the other in the longitudinal direction of the lance. One of the two coupling parts has, on its open connection end, an opening or groove that extends from the front face of the coupling part in the longitudinal direction of the lance and that has, spaced apart from the front face, an extension formed in the peripheral direction of the coupling part. A raised portion is formed on the other coupling part, and this raised portion engages in the extension. A blocking device movable in the longitudinal direction of the lance is arranged on the top part or bottom part of the lance, such that a catch element of the blocking device is arranged at least partially between at least one part of the raised portion and at least one part of the opening or groove extending in the longitudinal direction of the lance. Such a device allows simple detachment and connection of the top part to the bottom part, wherein both coupling parts are inserted one into the other in the axial direction and then slightly rotated relative to each other.

The blocking device is arranged accordingly with its catch element between the raised portion of the one coupling part and the opening or groove of the other coupling part and prevents, in the normal operating position of the lance, the coupling parts from rotating relative to each other, so that they can be detached from each other. The normal operating position of the lance is a position in which a sampler or sensor placed on the bottom part of the lance can be immersed in metal melts. The bottom end of the lance is thus located underneath the top end of the lance.

Preferably, the connection of the two coupling parts is constructed as a bayonet catch, since a bayonet catch is also suitable for long and problem-free use under the relatively difficult and mechanically demanding conditions of use of the lance. The top part can be coupled, for example, multiple times with fitting, changing, and different bottom parts, so that, for example, different connection conditions of various sensors or samplers can be taken into account. The coupling parts are preferably constructed essentially as hollow cylinders with essentially circular cross sections, so that the electrical lines can be guided within these cylinders.

The blocking device is expediently arranged on the lance such that it is movable by the force of gravity. Therefore, after the connection of the top part to the bottom part, in the operating position, the blocking device moves itself downward and prevents the coupling parts of the top part and the bottom part from being able to rotate relative to each other and to become detached. Expediently, the blocking device is arranged on the top part of the lance, so that it can be used multiple times, when a bottom part is exchanged for a new part.

It is further expedient that the coupling part arranged on the bottom part of the lance be inserted into the coupling part arranged on the top part of the lance. Therefore, the top part, which is to be used multiple times, can be constructed more robustly than the bottom part. On the plug-in coupling an electrical coupling is expediently arranged, with which signal lines arranged in the bottom part can be coupled to the forwarding signal lines of the top part.

The coupling parts essentially have a circular cross section and a hollow space in their interior, which ensures, first, easy production and, second, simple functionality of the rotating mechanism. As the bayonet catch, a well known closure from, among other things, optics, photo technology or lamp technology can be used. It is distinguished essentially in that two tubular parts are pushed one in the other in the longitudinal direction, and then, by a rotation relative to each other about the longitudinal axis, locking results by a groove and a raised portion engaging in the groove, so that the two parts can no longer be pulled apart without additional means.

The blocking element can preferably be arranged on the outside, but also inside of the tubes. In one arrangement in the interior, longitudinal slots are provided in the outer coupling part, through which guide elements arranged on the blocking element project outwardly, and thus movement of the blocking element in the axial direction is possible. For detaching the two coupling parts from each other, the blocking element can be pulled upward. It automatically falls into the locking position, as soon as the lance sinks downwardly with its bottom part. If the blocking element is arranged on the outside, it can move without more in the longitudinal direction. In the blocking position or latched position, it cannot rotate, so that the coupling parts cannot rotate relative to each other. This means that, for example, a blocking element arranged on the top part of the lance has, on its bottom side, a projection (a catch element), which engages in a corresponding recess of the coupling part of the bottom part of the lance, and is then arranged between the stop of the coupling part of the top part and the raised portion of the coupling part of the bottom part, so that the two coupling parts cannot be detached from each other. Therefore, because the blocking device falls in a gliding way into the fixed position, an automatic fixing is ensured, without the operator having to consciously engage and lock the device.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
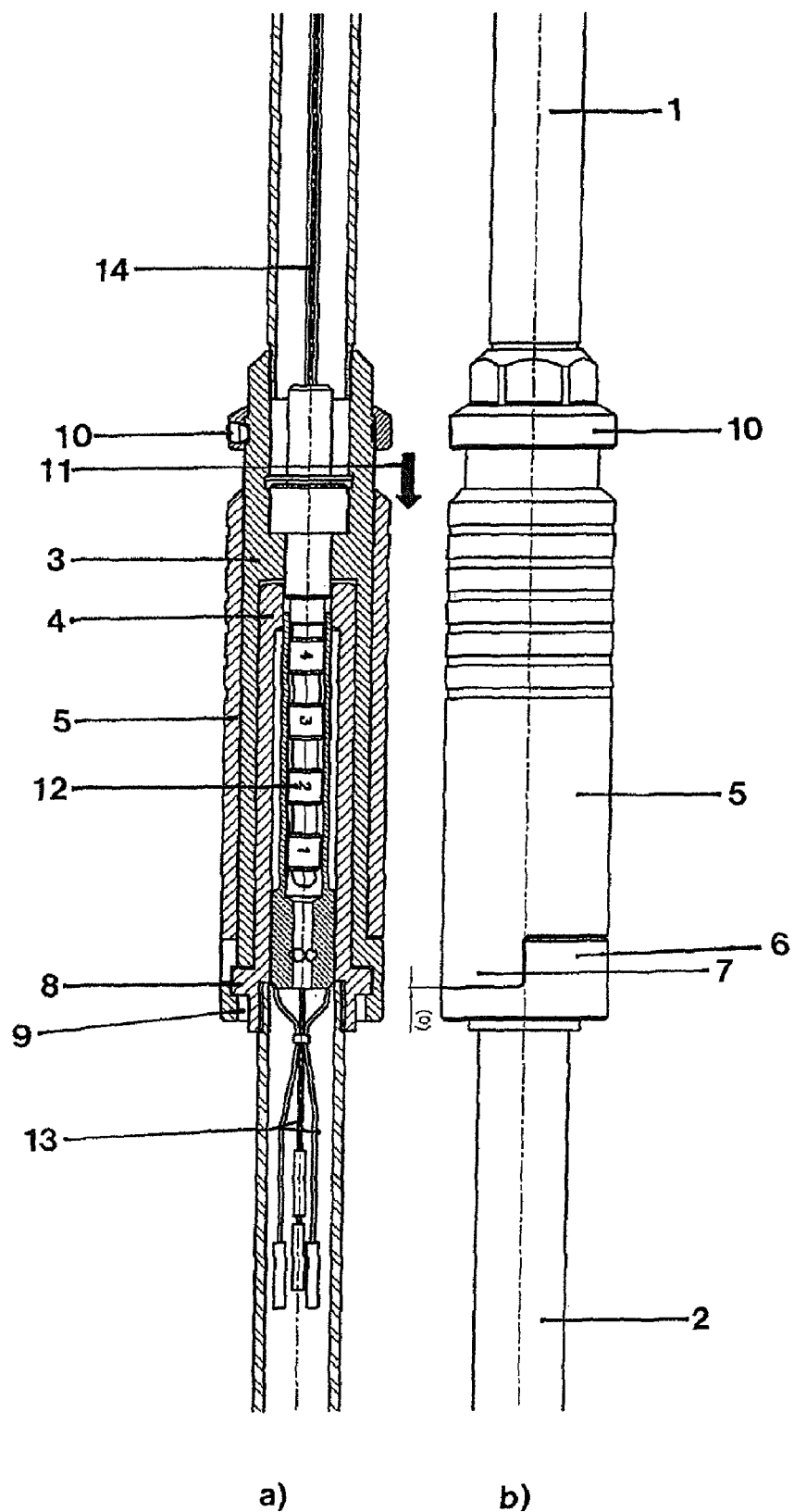
FIG. 1 is a longitudinal section (a) and a side view (b) illustrating a lance with a plug-in coupling according to an embodiment of the invention.

In FIG. 1 a plug-in coupling of a lance is shown, which is used, for example, in steelworks. The lance is well known per se to the person skilled in the art, and is therefore not shown completely. The plug-in coupling connects the top part 1 to the bottom part 2 in a simple and secure manner. For this purpose, the top part 1 has a coupling part 3, and the bottom part 2 has another coupling part 4. The top part 1 and bottom part 2 are formed essentially with a tubular shape having a circular cross section, just like the corresponding coupling parts 3; 4.

The two coupling parts 3; 4 are connected to each other by a bayonet catch. The bayonet catch is secured by a blocking device 5. The blocking device 5 is constructed essentially as a tube that surrounds the outside of the coupling part 3 with sufficient play, so that it can move longitudinally. The blocking device 5 falls downwardly by itself in the state shown in the drawing, because it is formed as a tube that can slide on the coupling part 3. It falls onto a stop 6 on which it lies and thus prevents detachment of the bayonet catch. For this purpose, in the shown locking position, the catch element 7 of the blocking device 5 is arranged on its inside in the peripheral direction between the raised portion 8 of the coupling part 4 of the bottom part 2 and the opening/groove 9 of the coupling part 3 of the top part 1. Therefore, rotational movement of the coupling part 4 is not possible in a manner that the raised portion 8 rotates in the extension of the coupling part 3 into the opening/groove 9, so that the two coupling parts 3; 4 could be separated from each other.

For detaching the coupling, the blocking device 5 must be raised. So that it cannot detach automatically from the top part 1 of the lance, an end stop 10 is provided on the coupling part 3. In this way, the blocking device 5 can be moved only between the stop 6 and the end stop 10. The arrow 11 marks the direction of movement of the blocking device 5 for locking.

The coupling finally contains an electrical coupling 12, by which different signal cables 13, which are connected to the sensor, can be connected to a cable 14 for forwarding the measurement signals. By the numerals 1 to 4 of the electrical coupling 12 indicated in the sectional diagram, the different contacting options (contact points) are shown.

Figure 2:
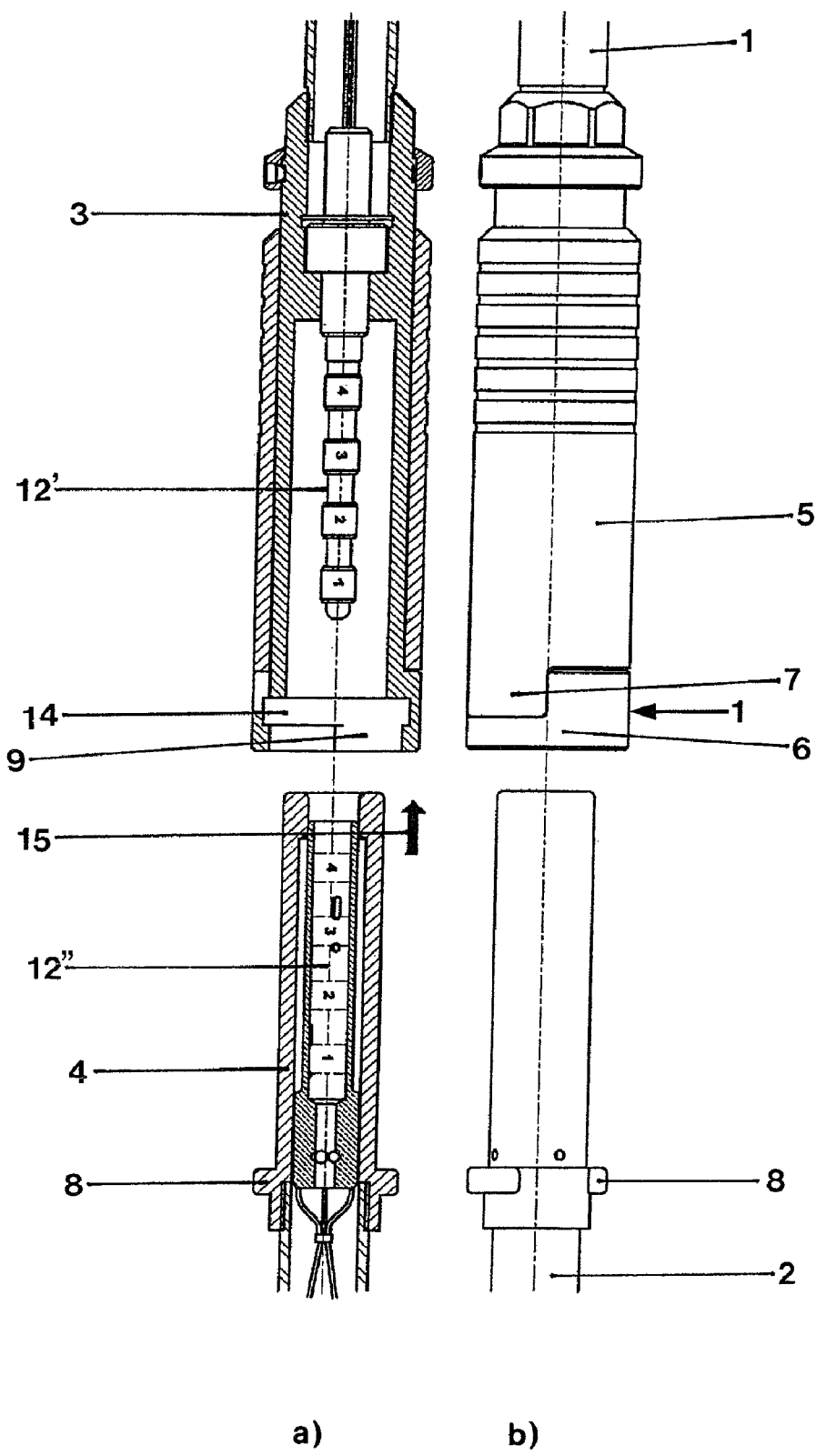
FIG. 2 is a pair of views similar to FIG. 1 illustrating the coupling in the decoupled state.

In FIG. 2 the coupling is shown in the detached state. Here, for one, the different contact points 1 to 4 can be seen on the plug 12' of the electrical coupling 12, and correspondingly on the socket 12" of the electrical coupling 12. In FIG. 2a) is shown the opening/groove 9, which opens into a horizontal extension 14 running around the axis of the plug-in coupling. When the coupling parts 3; 4 are joined together in the direction of the arrow 15, the raised portion 8 on the coupling part 4 of the bottom part 2 is guided through groove 9 of the coupling part 3 of the top part 2. Here, it presses against a projection of the catch element 7 arranged in the interior of the blocking device 5.

The blocking device 5 is pushed upward and completely opens up the opening/groove 9 and also the extension 14, so that after complete insertion of the coupling part 4 into the coupling part 3, the two coupling parts 3; 4 can be rotated relative to each other. Here, the raised portion 8 in the extension 14 moves away from the opening/groove 9. As soon as the inner projection of the catch element 7 no longer contacts the top side of the raised portion 8, because this was moved past the projection of the catch element 7 in the peripheral direction, the blocking device 5 automatically falls downward. In this manner, the projection of the catch element 7 arranged in the interior prevents the raised portion 8 from being able to rotate back toward the opening/groove 9. In this state, the two coupling parts 3; 4 are not detachable from each other.

Figure 3:
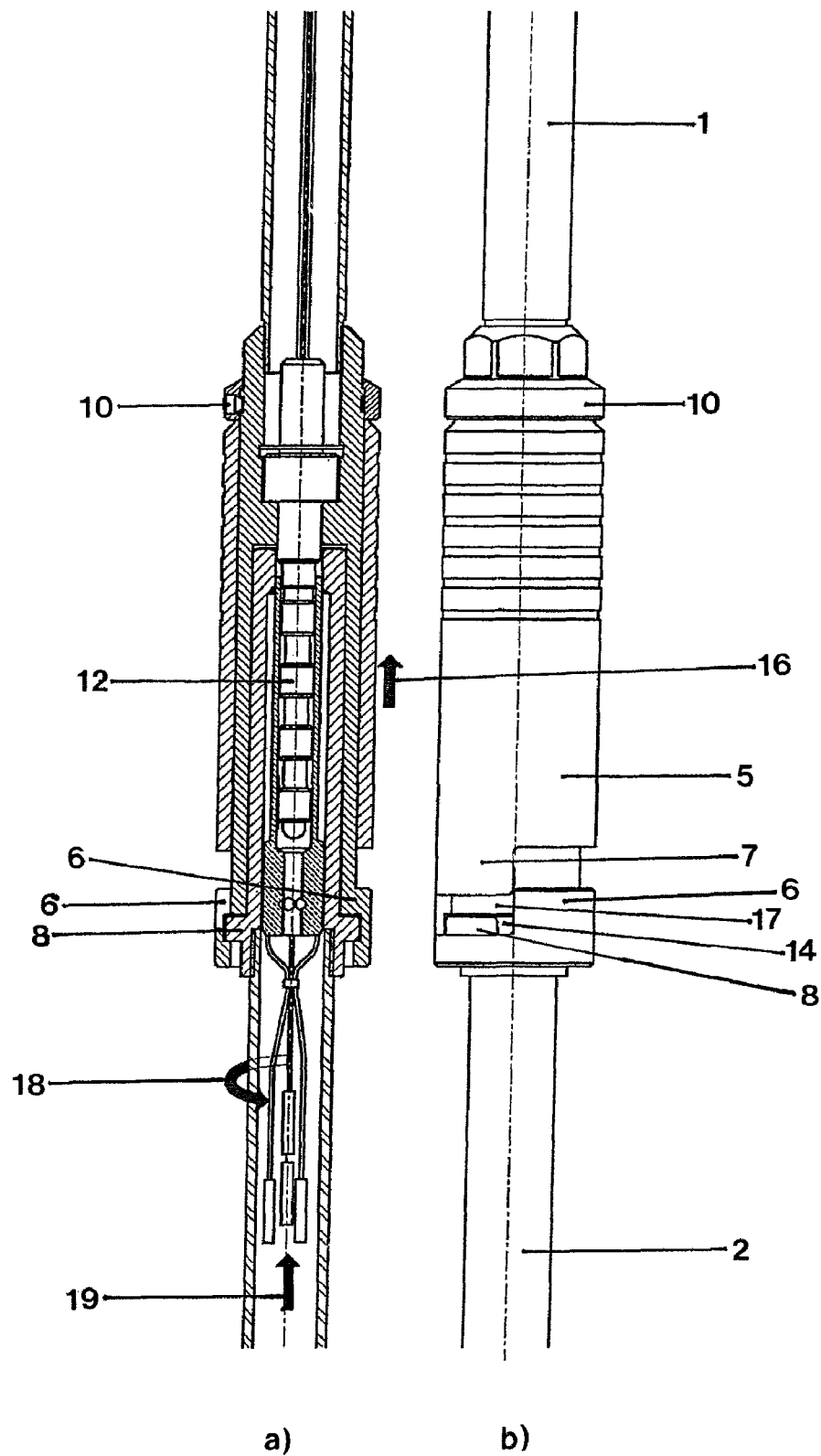
FIG. 3 is a pair of views similar to FIG. 1 illustrating the movement for unlocking and detaching the top part of the lance from the bottom part.

In FIG. 3 the position of the blocking device 5 during unlocking the coupling is shown. For this purpose, the blocking device 5 is pushed in the direction of the arrow 16. Here, the possibility of movement of the raised portion 8 in the extension 14 is enabled, because the catch element 7 was pushed out of the recess 17 of the top part 1. The bottom part 2 with the coupling part 4 can be rotated in the rotational direction of the arrow 18 and pulled against the direction of the arrow 19, as soon as the raised portion 8 is located in the opening/groove 9.

Figure 4:
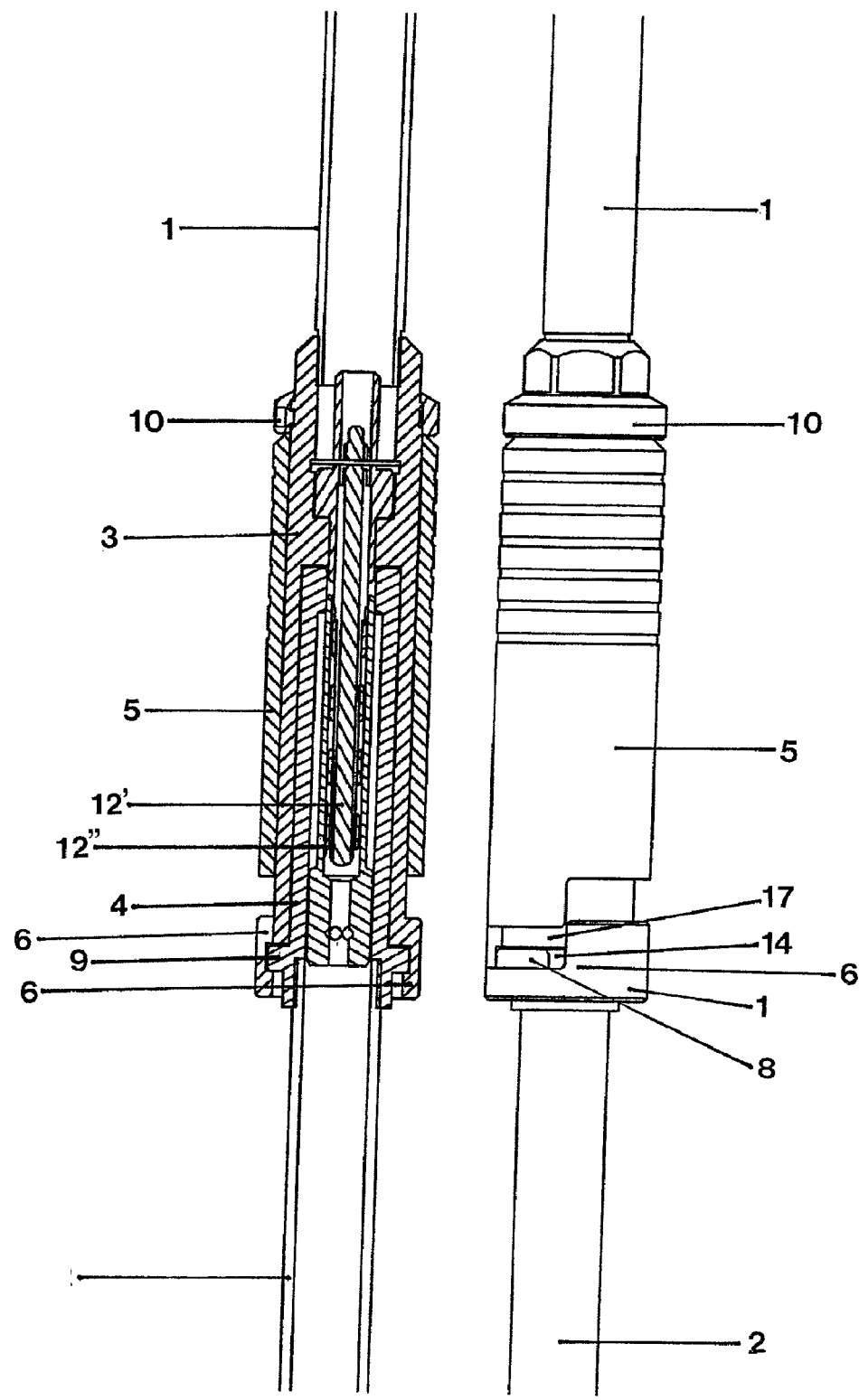
FIG. 4 is a pair of views illustrating the coupling in the position according to FIG. 3, wherein the contact piece is also shown in cross section (without cable connections).

The diagram in FIG. 4 corresponds essentially to FIG. 3, wherein the electrical coupling 12 with the plug 12' and the socket 12" are also shown in section.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A lance for receiving a sensor or sampler for metal melts, comprising a top part (1) and a bottom part (2) provided for arrangement on the sensor or sampler, the top part (1) and the bottom part (2) being detachably connected to each other by a plug-in coupling, the plug-in coupling having two coupling parts (3; 4) insertable one in the other in a longitudinal direction of the lance, one of the coupling parts being arranged on the top part (1) and the other of the coupling parts being arranged on the bottom part (2) of the lance, one of the coupling parts (3; 4) having, on its open connection end, an opening or groove (9) extend from a front face of the one coupling part in the longitudinal direction of the lance and having, spaced from the front face, an extension (14) formed in a peripheral direction of the one coupling part, and the other coupling part having a raised portion (8) that engages in the extension (14), and a blocking device (5) arranged on the top part (1) or bottom part (2) of the lance and movable in the longitudinal direction of the lance, the blocking device (5) having a catch element (7) arranged at least partially between at least one part of the raised portion (8) and at least one part of the opening or groove (9) extending in the longitudinal direction of the lance, wherein the blocking device (5) is arranged such that it is movable on the lance by force of gravity, such that after connection of the top part to the bottom part, in an operating position, the blocking device moves itself downward and prevents the two coupling parts from being detached from each other.

2. The lance according to claim 1, wherein the two coupling parts (3; 4) are plugged one in the other as a bayonet catch.

3. The lance according to claim 1, wherein the coupling parts (3; 4) have a form essentially as hollow cylinders with essentially circular cross sections.

4. The lance according to claim 1, wherein the blocking device (5) is arranged on the top part (1) of the lance.

5. The lance according to claim 1, wherein the coupling part (4) is arranged on the bottom part (2) of the lance and is plugged into the coupling part (3) arranged on the top part (1) of the lance.

6. The lance according to claim 1, wherein an electrical coupling (12) is arranged in the plug-in coupling.

* * * * *